(12) United States Patent
Hosokawa

(10) Patent No.: US 9,360,326 B2
(45) Date of Patent: Jun. 7, 2016

(54) TURNING PROGRESS DISPLAY APPARATUS, AUTOPILOT DEVICE AND METHOD OF DISPLAYING TURNING PROGRESS

(71) Applicant: Furuno Electric Co., Ltd., Nishinomiya (JP)

(72) Inventor: Tenpei Hosokawa, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 0 days.

(21) Appl. No.: 14/527,630

(22) Filed: Oct. 29, 2014

(65) Prior Publication Data

US 2015/0120102 A1 Apr. 30, 2015

(30) Foreign Application Priority Data

Oct. 31, 2013 (JP) ................. 2013-227292

(51) Int. Cl.
*G01C 21/20* (2006.01)
(52) U.S. Cl.
CPC ..................... *G01C 21/203* (2013.01)
(58) Field of Classification Search
CPC  B63B 49/00; B63B 2213/00; B63B 2710/00; G01C 21/20; G01C 21/203
See application file for complete search history.

(56) References Cited

U.S. PATENT DOCUMENTS

| | | | | |
|---|---|---|---|---|
| 4,129,087 | A * | 12/1978 | Dimmick | G05D 1/0206 114/144 E |
| 7,143,363 | B1 * | 11/2006 | Gaynor | B63J 99/00 340/461 |
| 8,296,001 | B1 * | 10/2012 | Kabel | G01C 21/22 340/988 |
| 8,626,365 | B2 | 1/2014 | Shimo et al. | |
| 2007/0078598 | A1 * | 4/2007 | Watanabe | B60K 37/02 701/429 |
| 2007/0244639 | A1 * | 10/2007 | Butterworth | B63H 25/02 701/431 |
| 2010/0048271 | A1 * | 2/2010 | Champagne | A63F 13/10 463/6 |
| 2014/0129131 | A1 * | 5/2014 | Davis | B63B 49/00 701/400 |
| 2015/0066240 | A1 * | 3/2015 | Das Adhikary | G01C 21/12 701/1 |

FOREIGN PATENT DOCUMENTS

| | | |
|---|---|---|
| JP | 07242199 A | 9/1995 |
| JP | 2005178434 A | 7/2005 |
| JP | 2012179968 A | 9/2012 |

* cited by examiner

*Primary Examiner* — Jerrah Edwards
*Assistant Examiner* — Tamara Weber
(74) *Attorney, Agent, or Firm* — Alleman Hall McCoy Russell & Tuttle LLP

(57) ABSTRACT

A turning progress display apparatus is provided. The turning progress display apparatus includes an azimuth information acquiring module configured to acquire azimuth information that is at least one of information of an orientation of a movable body, information of a traveling direction of the movable body, and information that changes cooperating with a change of the orientation of the movable body, a progress calculating module configured to calculate a progress of the turn based on the azimuth information acquired by the azimuth information acquiring module and a target value of the azimuth information, and a display unit configured to display the turning progress calculated by the progress calculating module.

9 Claims, 8 Drawing Sheets

TURNING PROGRESS DISPLAY APPARATUS, AUTOPILOT DEVICE AND METHOD OF DISPLAYING TURNING PROGRESS

CROSS-REFERENCE TO RELATED APPLICATION(S)

This application claims priority under 35 U.S.C. §119 to Japanese Patent Application No. 2013-227292, which was filed on Oct. 31, 2013, the entire disclosure of which is hereby incorporated by reference.

TECHNICAL FIELD

This disclosure generally relates to a turning progress display apparatus, which displays progress of turning of a ship.

BACKGROUND OF THE INVENTION

Conventionally, autopilot devices which automatically perform steering of ships according to settings have been known. Such an autopilot device can cause a ship concerned to travel on a target course by controlling its rudder based on a difference (variation angle) between the target course and a heading of the ship obtained by a heading sensor. JP1995-242199A, JP2005-178434A, and JP2012-179968A disclose arts relating to such autopilot devices.

JP1995-242199A discloses a method of controlling a rudder by an autopilot device when changing a target course. JP2005-178434A discloses an autopilot device that causes a ship to travel in a circle by gradually changing a target course. JP2012-179968A discloses an autopilot device that stably performs a course control by controlling a rudder according to a wind direction.

Since the autopilot device automatically controls the rudder based on the difference between the target course and the heading, while the ship turns, an operator cannot grasp when the ship concerned stops turning. Unlike an automobile, it generally takes time for a ship to turn and the ship generally rocks while turning. Therefore, the operator desires to grasp the progress of the turn. In this regard, JP1995-242199A, JP2005-178434A, and JP2012-179968A do not disclose anything about notifying the progress of the turn while the ship turns.

Moreover, conventionally, there has been a case where a course after turning and a current heading are displayed simultaneously on the autopilot device, a general-purpose display, etc. Hereinafter, such a case is described with reference to FIGS. 8A and 8B. FIG. 8A is a display screen before the turn. A mode display section 71, a target course display section 72, a heading display section 73, and a rudder angle display section 74 are displayed on the display screen.

In the mode display section 71, "Auto" is displayed during normal autopilot, and "180T" is displayed when turning by a large degree according to a change of the target course. In the target course display section 72, the target course is displayed as a number. In the heading display section 73, the current heading is displayed as a number. In the rudder angle display section 74, the rudder angle and the direction are displayed by using numbers and a scale bar.

FIG. 8B is a display screen while turning. With reference to FIG. 8B, the target course is 169 degrees and the current heading is 303 degrees. Therefore, by calculating difference therebetween, an angle by which the ship has left to turn can be roughly grasped.

However, the heading obviously changes while the ship turns, and therefore, the number in the heading display section 73 rapidly changes. Therefore, the operator needs to read the number changing rapidly and then calculate the difference between the number and the target course, otherwise he/she cannot grasp how much more the ship has left to turn. Besides, especially since the ship rocks while turning, it is not realistic to perform those operations.

SUMMARY OF THE INVENTION

The purpose of this disclosure relates to providing a turning progress display apparatus, with which the progress of turning of a ship is able to easily and instinctively be grasped.

According to a first aspect of this disclosure, a turning progress display apparatus with the following configuration is provided. That is, the turning progress display apparatus includes an azimuth information acquiring module, a progress calculating module, and a display unit. The azimuth information acquiring module acquires azimuth information that is at least one of information of an orientation of a movable body, information of a traveling direction of the movable body, and information that changes cooperating with a change of the orientation of the movable body. The progress calculating module calculates a progress of the turn based on the azimuth information acquired by the azimuth information acquiring module and at least one of a target value of the azimuth information for before the turn and a target value of the azimuth information for the turn. The display unit displays the turning progress calculated by the progress calculating module.

Since the turning progress is displayed, an operator can instinctively grasp the turning progress.

With the turning progress display apparatus, the movable body is preferred to be a ship.

Since the ship takes time to turn, the effect that the turning progress can be instinctively grasped can more effectively be utilized.

With the turning progress display apparatus, the display unit is preferred to display the azimuth information acquired by the azimuth information acquiring module and the target value of the azimuth information for the turn, as the turning progress.

Thereby, the operator can instinctively grasp a time length, an angle, and the like to the completion of the turn that generally the operator particularly wants to grasp among the information of the turning progress.

With the turning progress display apparatus, the display unit is preferred to also display the target value of the azimuth information for before the turn, as the turning progress.

Thereby, the operator can grasp roughly how much the ship has turned since the start of the turn until a current timing, and thus, he/she can instinctively grasp the time length, the angle, and the like to the completion of the turn more easily.

The turning progress display apparatus is preferred to have the following configuration. That is, the display unit displays a scale part in either one of a circular shape and an annular shape. In the scale part, a portion corresponding to a range between the value of the azimuth information acquired by the azimuth information acquiring module and the target value of the azimuth information for the turn is displayed in a different mode from other portion.

Since the azimuth information is a value regarding angle, by displaying the turning progress with the scale in either one of the circular shape and the annular shape, the operator can instinctively grasp the turning progress more easily.

With the turning progress display apparatus, the progress calculating module is preferred to calculate the turning progress based on information indicating either one of a start and a completion of the turn, and the azimuth information acquired by the azimuth information acquiring module.

Thereby, the turning progress can be displayed without obtaining positional information.

The turning progress display apparatus is preferred to have the following configuration. That is, the movable body is a ship. The information indicating the orientation of the movable body is a heading acquired by a heading sensor. The progress calculating module calculates the turning progress based on the heading acquired by the heading sensor and at least one of the target value of the azimuth information for before the turn and the target value of the azimuth information for the turn.

Thereby, the operator can instinctively grasp the change of the heading according to the turn.

In the turning progress display apparatus, the display unit is preferred to display a mark of the ship that rotates corresponding to the turn.

Thereby, the operator can instinctively grasp the change of the heading according to the turn more easily.

In the turning progress display apparatus, the information that changes cooperating with the change of the orientation of the ship is preferred to be a wind direction relative to the movable body.

Thus, a change of the wind direction according to the turn can be instinctively grasped, and therefore, an effective display can be achieved when, for example, performing tacking or jibing of a yacht According to a second aspect of the disclosure, an autopilot device including the turning progress display apparatus and also an autopilot module configured to perform a turning operation by autopilot is provided.

Thus, the turn is performed despite of instructions from the operator during the autopilot, the effect that the turning progress can be instinctively grasped can more effectively be utilized.

According to a third aspect of the disclosure, the following method of displaying a progress of a turn is provided. The method includes acquiring azimuth information that is either one of information of an orientation of a movable body, information of a traveling direction of the movable body, and information that changes cooperating with a change of the orientation of the ship. The method includes calculating the progress of the turn based on the acquired azimuth information and a target value of the acquired azimuth information. The method includes displaying the calculated turning progress.

Since the turning progress is displayed, the operator can instinctively grasp the turning progress.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Next, one embodiment of this disclosure is described with reference to the appended drawings. An autopilot device 20 of this embodiment is installed in a ship as a movable body (hereinafter, may be referred to as "the ship concerned" or simply as "the ship"), and automatically steers a rudder 31 provided to the ship, to control a course of the ship.

Figure 1:
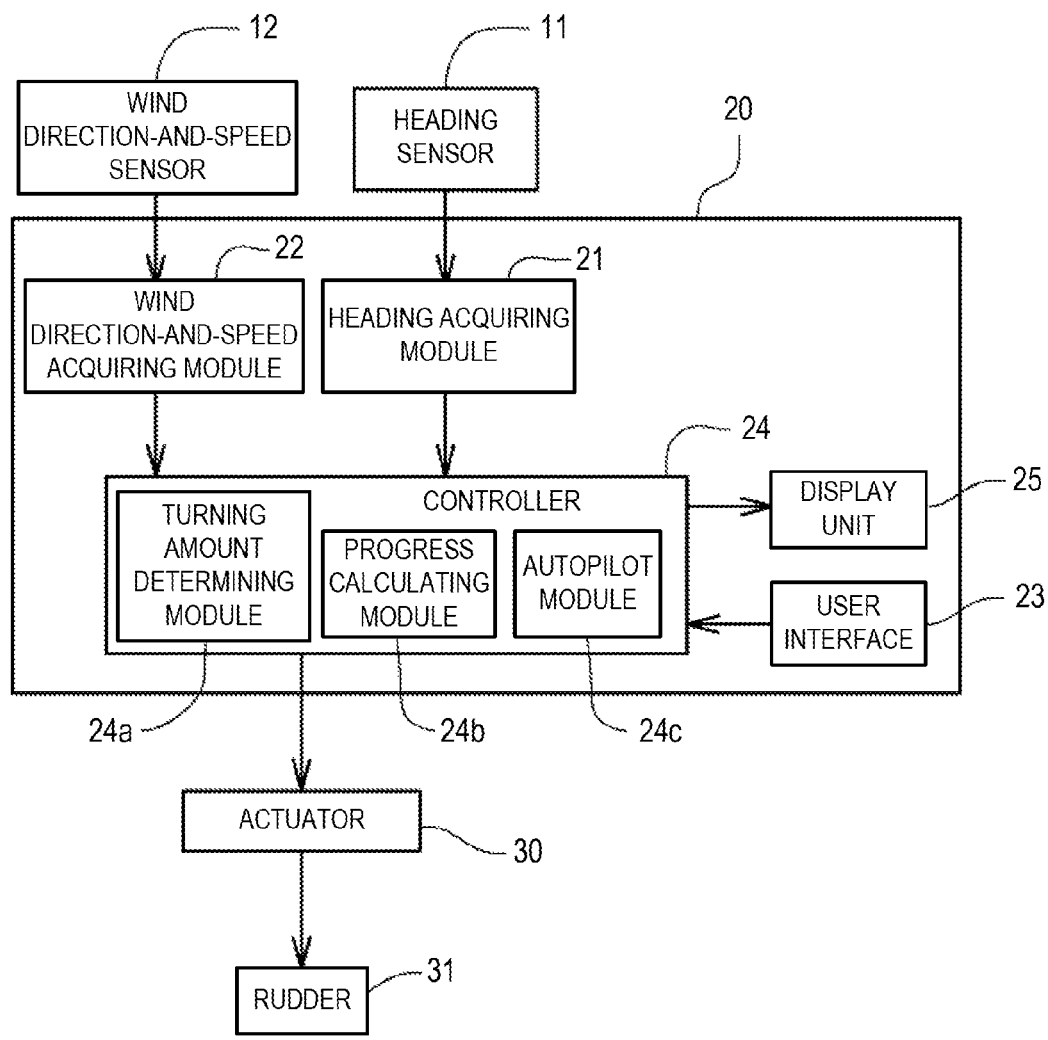
FIG. 1 is a block diagram illustrating a configuration of an autopilot device according to one embodiment of this disclosure.

As illustrated in FIG. 1, the autopilot device 20 of this embodiment includes a heading acquiring module 21, a wind direction-and-speed acquiring module 22, a user interface 23, a controller 24, and a display unit 25. Moreover, the autopilot device 20 is connected with a heading sensor 11 and a wind direction-and-speed sensor 12.

The heading sensor 11 detects a current heading (current azimuth information) and outputs the detected heading to the autopilot device 20. The wind direction-and-speed sensor 12 detects a current wind direction and a current wind speed and outputs the information to the autopilot device 20. The wind direction and the wind speed that can be detected by the wind direction-and-speed sensor 12 are a relative wind direction and a relative wind speed to the ship. Therefore, in the following description, the relative wind direction and the relative wind speed may simply be referred to as "the wind direction" and "the wind speed," respectively.

The heading acquiring module 21 acquires the heading outputted by the heading sensor 11 and outputs it to the controller 24. The wind direction-and-speed acquiring module 22 acquires the wind direction and the wind speed outputted by the wind direction-and-speed sensor 12 and outputs them to the controller 24.

The user interface 23 is comprised of keys, a dial and the like, configured to give instructions to the autopilot device 20. An operator can specify a target course and a target wind direction by controlling the dial. When the target course is specified, the autopilot device 20 performs steering to match the heading with the target course. Moreover, when the target wind direction is specified, the autopilot device 20 performs the steering to match the current wind direction with the target wind direction.

The controller 24 is a computer comprised of hardware, such as a CPU, a ROM and a RAM, and software, such as a program for autopilot. The controller 24 includes a turning amount determining module 24a, a progress calculating module 24b, and an autopilot module 24c.

The turning amount determining module 24a determines a turning amount of the ship based on the heading, the current wind direction, the target course, the target wind direction and the like, which are inputted thereto. The turning amount is, for example, when the target course is specified, a value by which a difference (variation angle) between the heading and the target course can be zero. A determination method of the turning amount is arbitrary, and for example, a PID control can be used. Note that, also in a case where the target wind direction is specified, the turning amount is similarly determined so that a difference between the heading and the target course can be zero.

The progress calculating module 24b calculates the progress of the turn based on the target course for before the turn, the heading acquired by the heading sensor 11, and the target course of the turn. The progress calculating module 24b can calculate the progress based only on the target courses and the heading, without using positional information and the like. The progress calculated by the progress calculating module 24b is displayed on the display unit 25. Note that, the progress used here indicates, in a case where at least one of a target value and a starting value is set, a current value with respect to the at least one of the target value and the starting value. Specifically, the progress indicates (1) when the starting value and the target value are set, how close the current value is to (or how far the current value is from) the starting value and the target value, (2) when only the start value is set, how close the current value is to (or how far the current value is from) the starting value, (3) when only the target value is set, how close the current value is to (or how far the current value is from) the target value, etc.

The autopilot module 24c turns the ship by performing the autopilot. Specifically, the autopilot module 24c generates a control signal including information of the turning amount determined by the turning amount determining module 24a. The control signal generated by the autopilot module 24c is outputted to an actuator 30.

The display unit 25 is comprised of a liquid crystal display, etc. The display unit 25 displays information relating to the autopilot. Specifically, as illustrated in FIG. 3B described later, a target course display section 41, a heading display section 42, a turning angle display section 43, and a turning progress display section 44 are displayed on the display unit 25. The display unit 25 may also display the mode display section and the rudder angle display section described in the conventional example. Note that, the display contents of the display unit 25 are described later in detail.

The actuator 30 is connected with the rudder 31 provided to the ship and steers the rudder 31 according to the control signal inputted from the autopilot module 24c. The actuator 30 may include a hydraulic cylinder and a hydraulic pump, or it may be any other kinds of actuators, such as an electric motor.

By the above configuration, the autopilot device 20 automatically steers the rudder to match the heading with the target course specified by the operator. On the water, when the ship receives influence of waves and wind and rocks, the operator needs to perform fine steering so as to stabilize the posture of the ship, and it is stressful to the operator. Therefore, the autopilot device 20 automatically steers the rudder to keep the course fixed without the operator performing the fine steering.

Note that, the autopilot device 20 has various modes, such as the mode for matching the heading with the target course as described above, and a mode for performing the automatic steering to travel on a route. Moreover, as modes using a wind direction, the autopilot device 20 has the mode for matching the current wind direction with the target wind direction as described above, and a mode for turning left and right against the wind direction (mode for tacking of a yacht).

Next, the contents displayed on the display unit 25 when the ship turns by the autopilot is described.

Figure 2A:
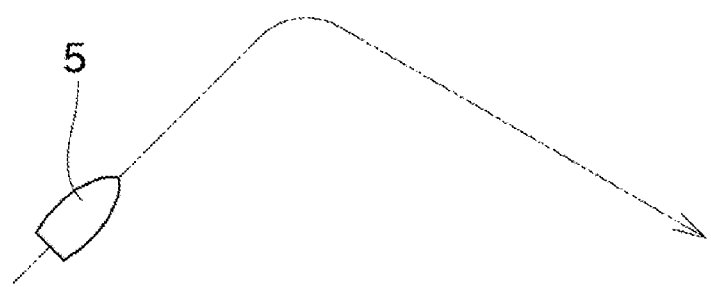
FIG. 2A is a view for describing a situation before a ship turns based on a target course and a heading.
Figure 2B:
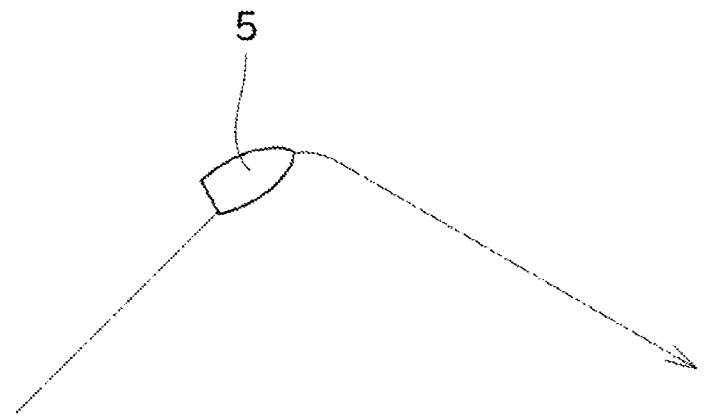
FIG. 2B is a view for describing a situation while the ship turns based on the target course and the heading.
Figure 2C:
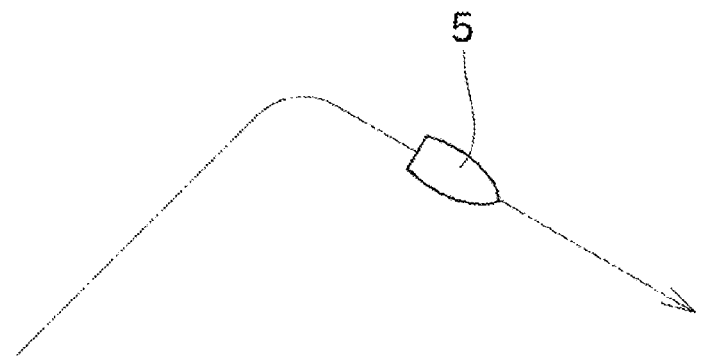
FIG. 2C is a view for describing a situation after the ship turns based on the target course and the heading.

First, a case where a ship 5 turns by 90 degrees based on the heading and the target course is described with reference to FIGS. 2A to 4B. In this case, the ship turns as illustrated in FIGS. 2A to 2C, for example. Note that, FIGS. 2A to 2C can be considered as the illustration of a case where the autopilot is performed along a route set with a curve, or a case where the target course is changed while the ship travels on or toward the target course.

Figure 3A:
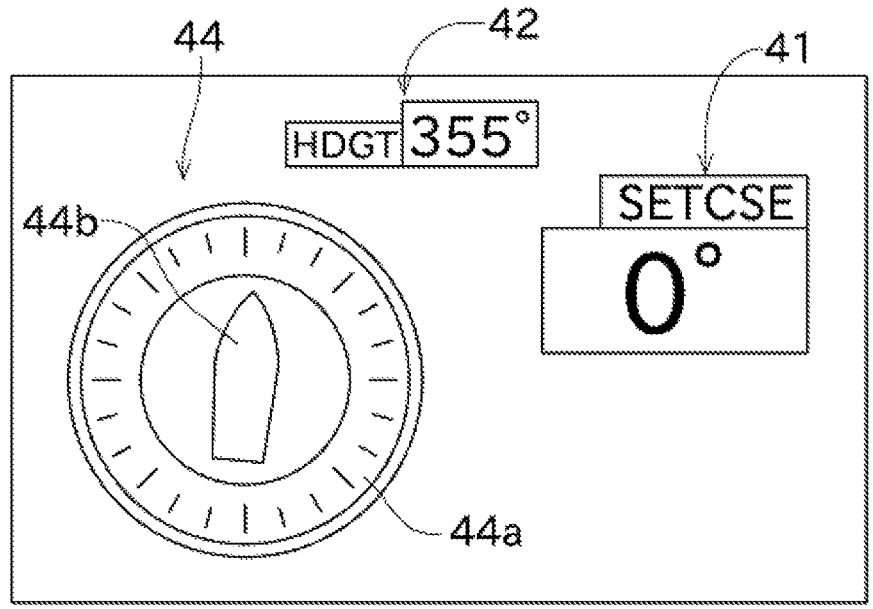
FIG. 3A is a view illustrating a display screen before the ship starts to turn based on the target course and the heading.
Figure 3B:
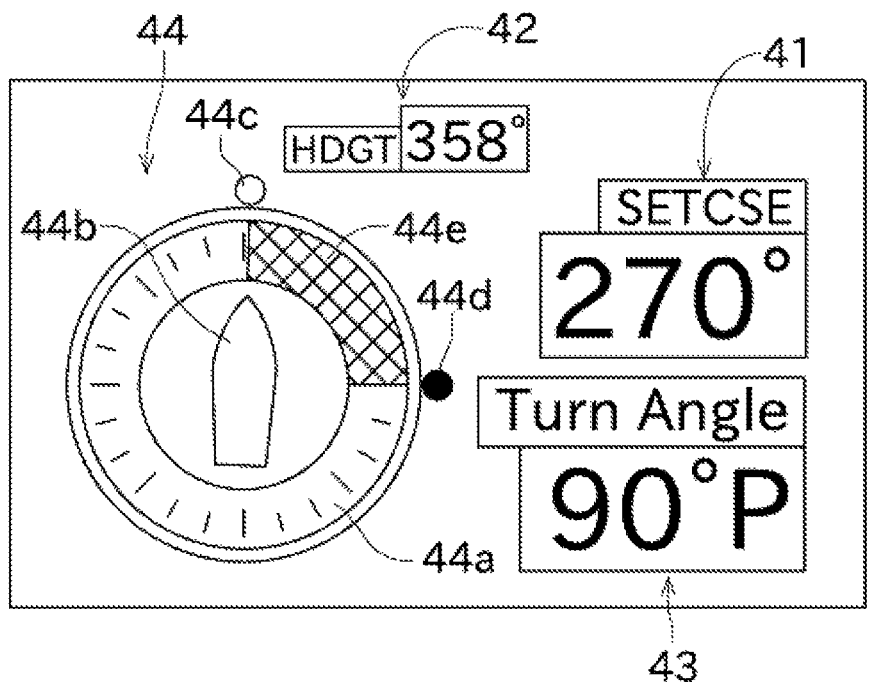
FIG. 3B is a view illustrating a display screen immediately after the ship start to turn based on the target course and the heading.
Figure 4A:
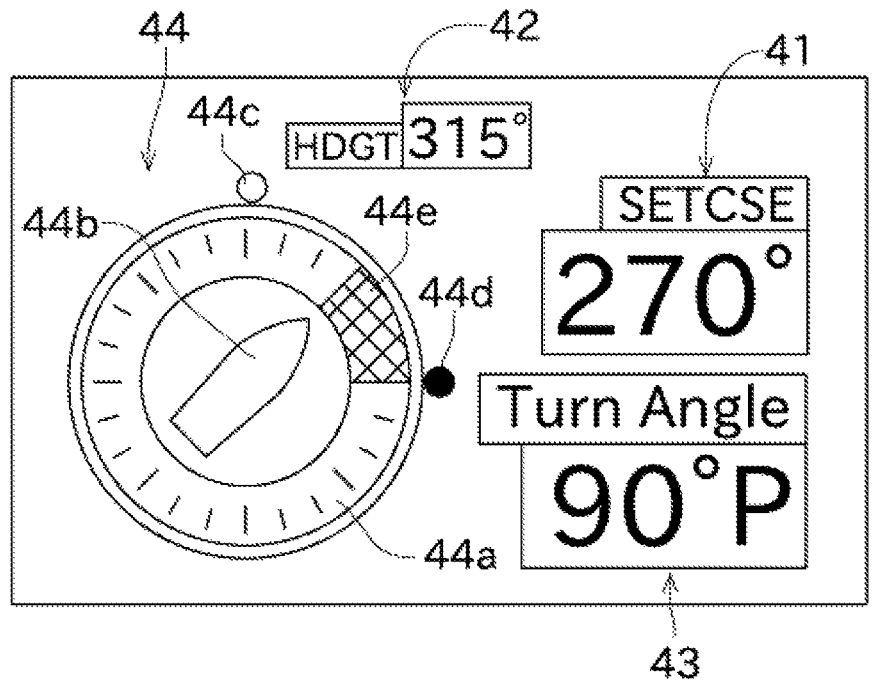
FIG. 4A is a view illustrating a display screen while the ship turns based on the target course and the heading.
Figure 4B:
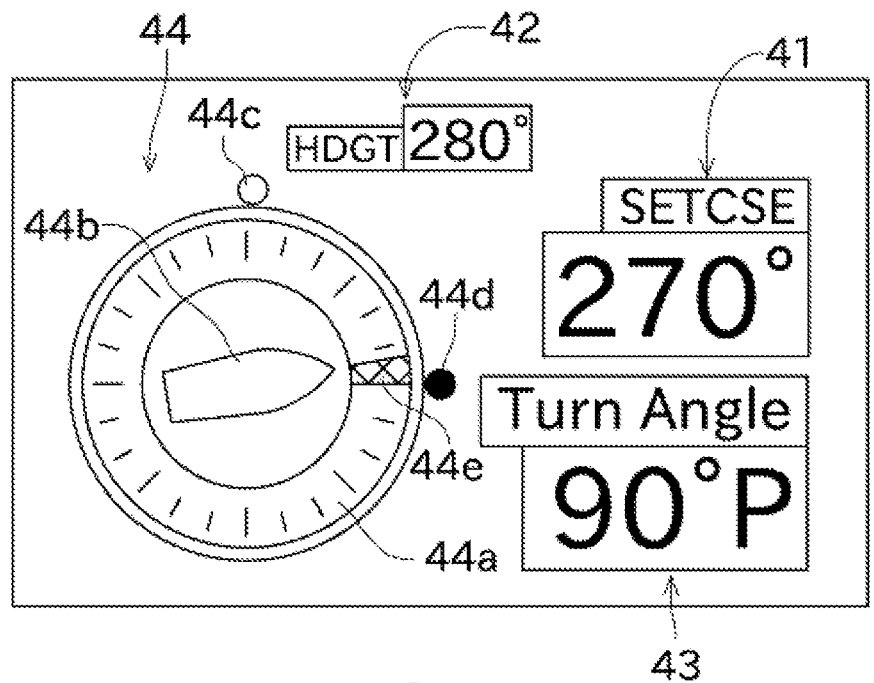
FIG. 4B is a view illustrating a display screen while the ship turns based on the target course and the heading.

FIG. 3A is a display screen on the display unit 25 displayed before the turn. The target course display section 41, the heading display section 42, and the turning progress display section 44 are displayed in FIG. 3A. Here, in the target course display section 41, the course specified through the user interface 23 or the like is displayed as a numeric value. In the heading display section 42, the current heading acquired by the heading sensor 11 is displayed as a numeric value.

In the turning progress display section 44 before the turn, a scale part 44a and a ship mark 44b are displayed. The scale part 44a has an annular (ring) shape and the ship mark 44b is displayed inside the ring of the scale part 44a. The ship mark 44b points, with its tip, at a position of the scale part 44a corresponding to the heading acquired by the heading sensor 11.

Note that, the turning progress display section 44 may be such that it is not displayed before the turn and then displayed when the turn is started. Moreover, the ship mark 44b may be omitted and the scale part 44a is displayed in a circular shape.

FIG. 3B is a display screen displayed on the display unit 25 immediately after the turn is started. When starting the turn, since a target course is newly set, the value in the target course display section 41 described above is changed to the new target course. Moreover, as the turn proceeds, the value displayed in the heading display section 42 changes.

Moreover, when the turn is started, the turning angle display section 43 is displayed on the display unit 25. In the turning angle display section 43, a turning angle that is the changed amount of the target course is displayed. In the example of FIGS. 3A and 3B, the target course is changed by 90 degrees, and therefore, the numeral value indicating 90 degrees (i.e., the turning angle), and a direction (P) to turn to are displayed in the turning angle display section 43. The turning angle display section 43 is displayed, starting from when the turn is started until the turn is completed, in other words, the turning angle display section 43 is not displayed while the ship does not turn.

Moreover, when the turn is started, the display mode of the turning progress display section 44 is changed from the display mode before the turn is started. In the turning progress display section 44, a starting point 44c, a completion point 44d, and an annular gauge 44e are displayed.

The starting point 44c is displayed at a position of the turning progress display section 44 corresponding to the target course for before the turn. The completion point 44d is displayed at a position of the turning progress display section 44 corresponding to the target course of the turn. The starting point 44c and the completion point 44d are both displayed as circular marks but display modes thereof are different. Particularly, the completion point 44d is displayed in a different color from other display contents (in a distinctive color), since the operator tends to think that the target course of the turn is more important than the target course for before the turn.

The annular gauge 44e is a portion of the scale part 44a corresponding to the rest of the turning amount, and the display mode thereof is different from other portion of the scale part 44a. Therefore, as illustrated in FIG. 3B, immediately after the turn is started, the annular gauge 44e covers an area substantially corresponding to 90 degrees that is the same as the turning angle. Then, a display area of the annular gauge 44e gradually becomes smaller as the turn proceeds (see FIGS. 4A and 4B).

In other words, an end of the annular gauge 44e on the starting point 44c side indicates the current heading. Therefore, the end of the annular gauge 44e and the tip of the ship mark 44b indicate the same azimuth.

Thus, in this embodiment, the progress of the turn is calculated based only on the target course for before the turn, the target course of the turn, and the current heading acquired by the heading sensor 11, and the progress of the turn is displayed on the display unit 25. Specifically, the operator can instinctively grasp roughly the angle by which the ship has turned so far, by referring to the starting point 44c and the end of the annular gauge 44e (or the ship mark 44b). Moreover, the operator can also grasp roughly the angle by which the ship has left to turn. Especially, since the operator generally wants to know how long it takes for the ship to start moving straight, the latter information is relatively more useful. Considering such situation, in this embodiment, the configuration in which the completion point 44d is displayed in the distinctive color and the display mode of the part of the scale part 44a corresponding to the rest of the turning amount (annular gauge 44e) is different from other part, is adopted.

Then the turn further proceeds, when the turn is completed, the turning angle display section 43 is no longer displayed and the starting point 44c, the completion point 44d, and the annular gauge 44e are no longer displayed. Then, the mode of the autopilot device 20 shifts to the normal autopilot mode.

As described above, the autopilot device 20 includes the heading acquiring module 21, the turning amount determining module 24a, the progress calculating module 24b, and the display unit 25. The heading acquiring module 21 acquires the azimuth information indicating the orientation of the ship. The turning amount determining module 24a determines the turning amount of the ship based on the heading acquired by the heading sensor 11 before or when the ship starts turning and based on the target value of the target course of the turn. The progress calculating module 24b calculates the progress of the turn based on the azimuth information acquired by the heading sensor 11 while the ship turns. The display unit 25 displays the progress of the turn obtained by the progress calculating module 24b.

Since the progress of the turn is displayed as above, the operator can instinctively grasp the progress of the turn.

Figure 5A:
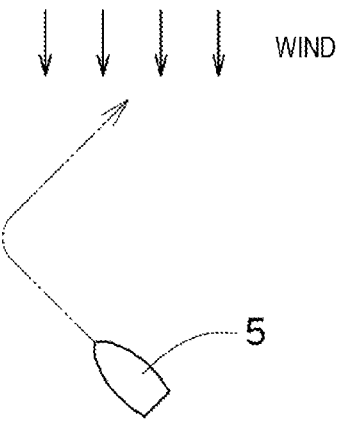
FIG. 5A is a view for describing a situation before the ship turns based on a current wind direction and a target wind direction.
Figure 5B:
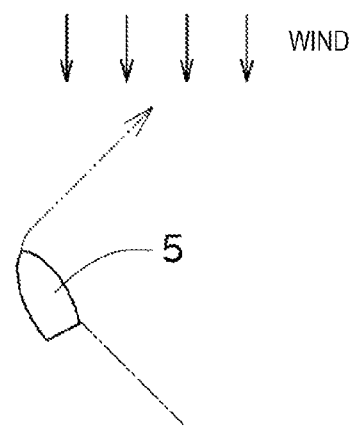
FIG. 5B is a view for describing a situation while the ship turns based on the current wind direction and the target wind direction.
Figure 5C:
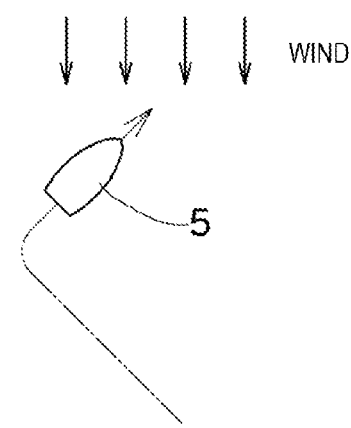
FIG. 5C is a view for describing a situation after the ship turns based on the current wind direction and the target wind direction.

Next, contents displayed on the display unit 25 in the mode where the ship 5 turns left and right against the wind direction as illustrated in FIGS. 5A to 5C are described. In this mode, two target wind directions symmetric to each other with respect to the heading are determined. Then, the target wind direction which the ship travels based on (the target wind direction against which the ship turns left or right), is switched between the two target wind directions every predetermined period of time or every predetermined distance.

Figure 6A:
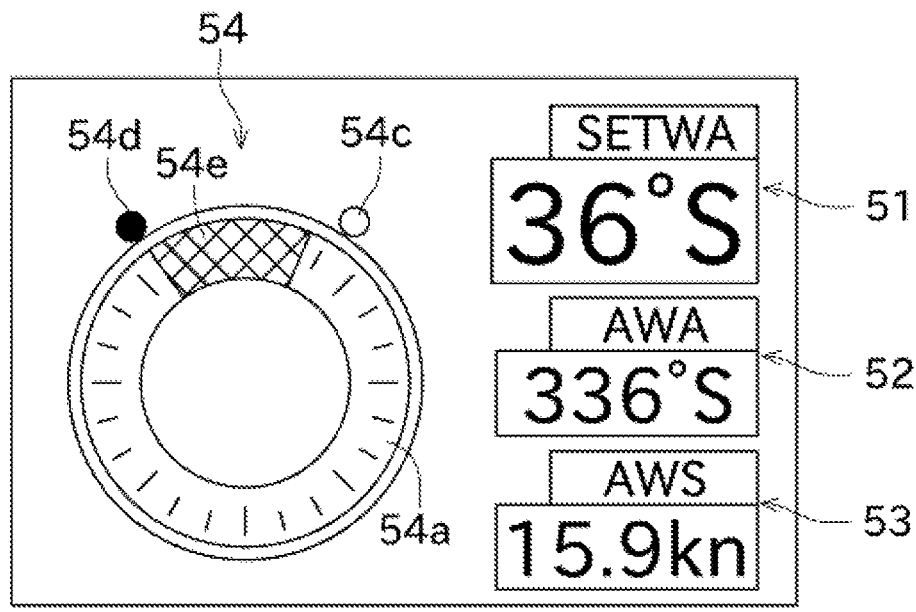
FIG. 6A is a view illustrating a display screen immediately after the ship starts turning based on the current wind direction and the target wind direction.

FIG. 6A is a display screen displayed on the display unit 25 immediately after the turn is started. In FIG. 6A, a target wind direction display section 51, a current wind direction display section 52, a ship speed display section 53, and a turning progress display section 54 are displayed.

Figure 6B:
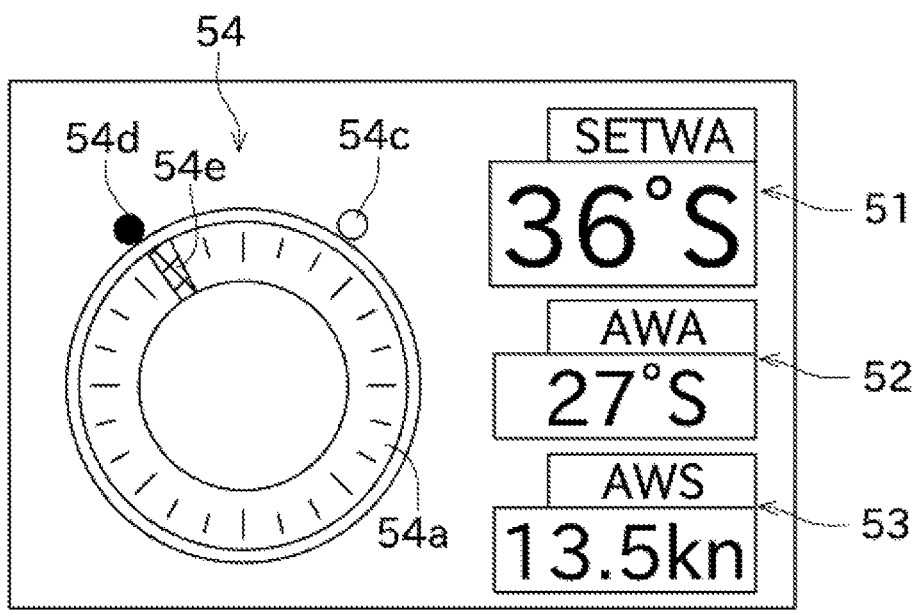
FIG. 6B is a vies illustrating the display screen while the ship turns based on the current wind direction and the target wind direction.

In the target wind direction display section 51, a current target wind direction is displayed as a numeral value. As illustrated in FIGS. 6A and 6B, while the ship turns, similar to the case of FIGS. 2A to 4B, the target wind direction which the ship turns based on is displayed in the target wind direction display section 51.

In the wind direction display section 52, the current wind direction acquired from the wind direction-and-speed sensor 12 is displayed as a numeral value. Therefore, the value in the wind direction display section 52 changes as the turn proceeds.

In the ship speed display section 53, the speed of the ship 5 acquired from a ship speed meter (not illustrated) is displayed. Note that, the ship speed may be either one of a relative speed to the ship and an absolute speed, or may be not displayed.

In the turning progress display section 54, a scale part 54a, a starting point 54c, a completion point 54d, and an annular gauge 54e are displayed. The details of the respective contents are only described briefly since they are similar to the case of FIGS. 2A to 4B. The scale part 54a is a scale for indicating wind directions, the starting point 54c indicates the target wind direction which the ship travels based on before the turn, and the completion point 54d indicates the target wind direction which the ship turns based on. Moreover, an end of the annular gauge 54e on the starting point side indicates the current wind direction.

By this configuration, the progress of the turn can be displayed by using the wind directions. Therefore, the autopilot device 20 can exert similar effects to the case of FIGS. 2A to 4B.

Next, the contents displayed on the display unit 25 when the ship keeps moving in a circle are described with reference to FIGS. 7A and 7B. The display screens in FIGS. 7A and 7B are not continuous in time sequence, but they are two display examples with different display modes.

Figure 7A:
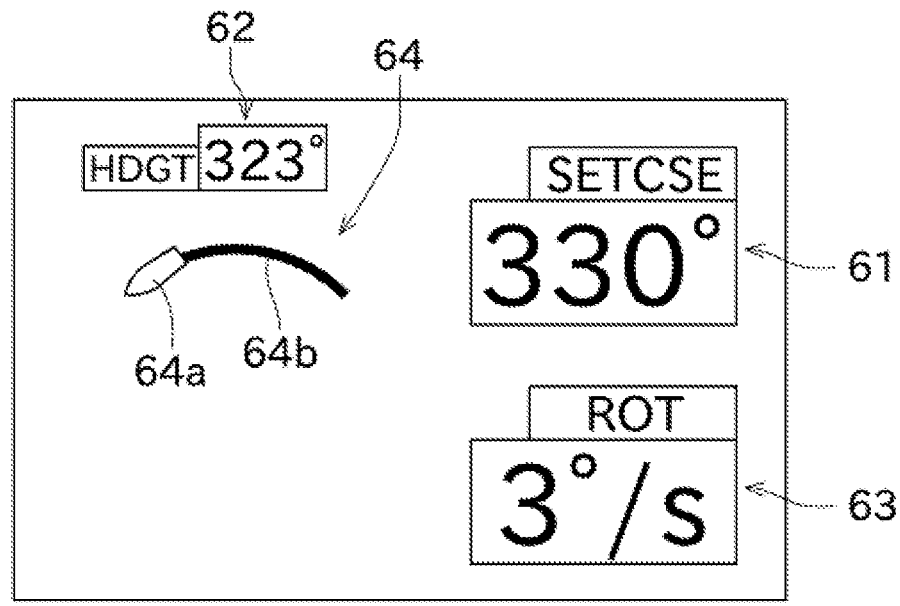
FIG. 7A is a view illustrating one example of a display screen when the ship performs a circular movement.

In FIG. 7A, a target course display section 61, a heading display section 62, a course change information display section 63, and a turning progress display section 64 are displayed. In the target course display section 61, a current target course is displayed as a numeral value. In the heading display section 62, the current heading acquired by the heading sensor 11 is displayed as a numeral value. In the course change information display section 63, a changing rate of the target course is displayed. In the example of FIGS. 7A and 7B, the target course is changed by 3 degrees every second.

In the turning progress display section 64 of FIG. 7A, a ship mark 64a and a track 64b are displayed. The ship mark 64a indicates a position of the ship in the circular track. Note that, since the ship performs the circular movement, the controller 24 can obtain the position of the ship in the circular movement based only on the heading (without requiring the positional information). The track 64b indicates the track of the ship. Therefore, an end of the track 64b on the opposite side to the ship mark 64a is the starting point of the circular movement.

Figure 7B:
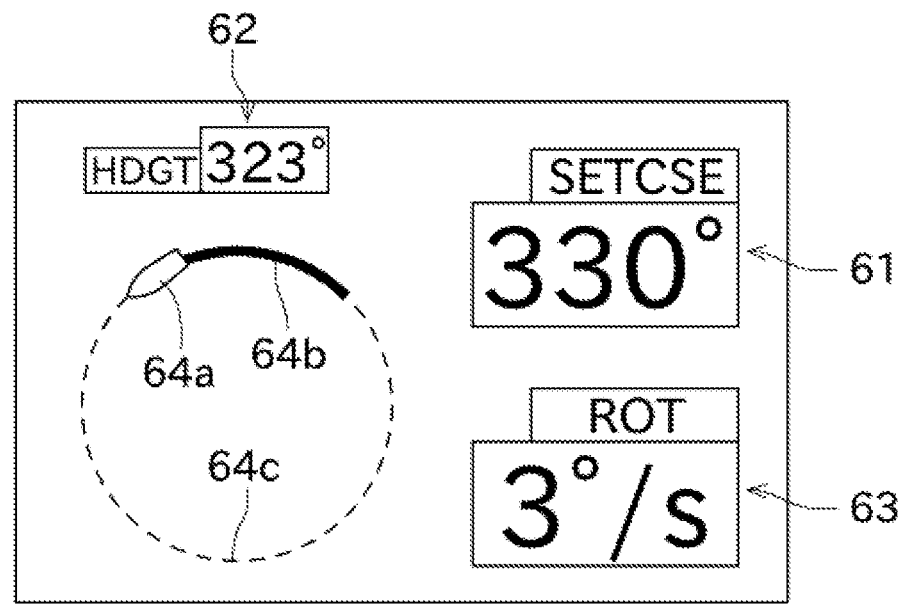
FIG. 7B is a view illustrating another example of the display screen when the ship performs the circular movement.
Figure 8A:
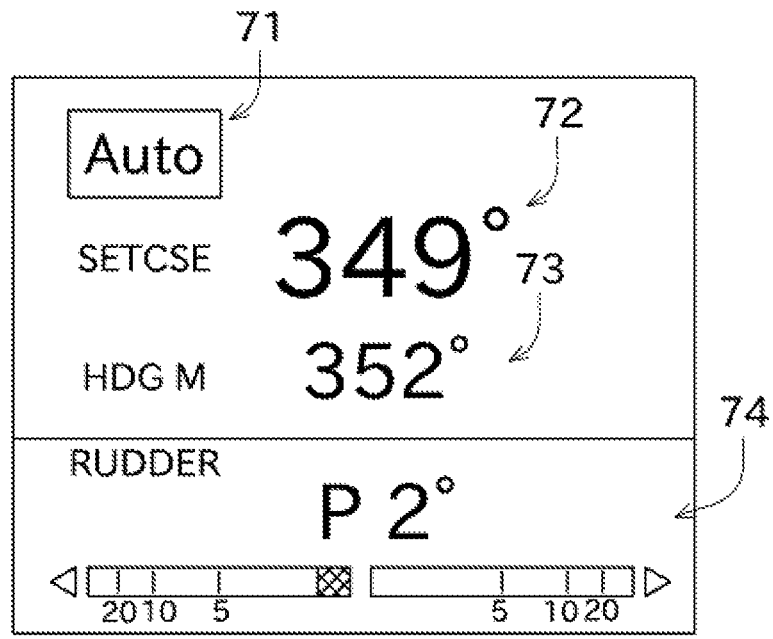
FIG. 8A is a view illustrating a display screen before a ship turns with a conventional autopilot device.
Figure 8B:
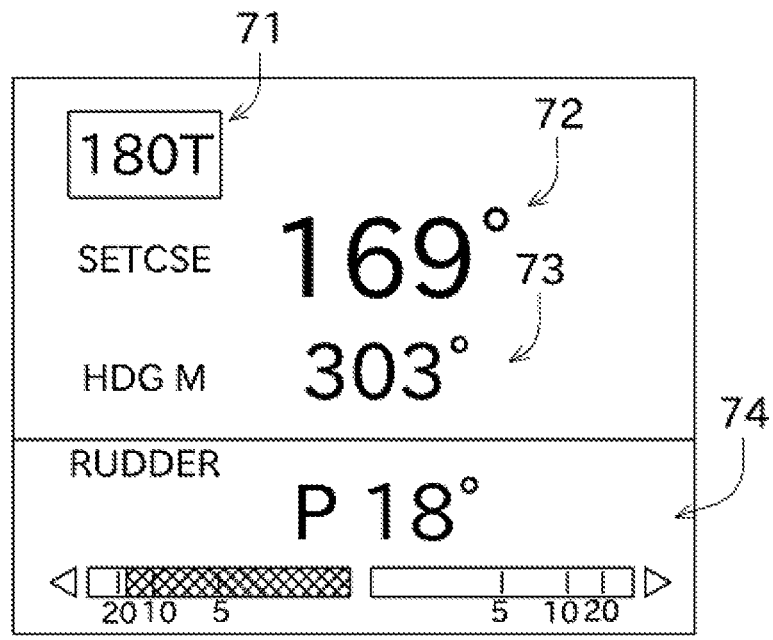
FIG. 8B is a view illustrating a display screen while the ship turns with the conventional autopilot device.

In the turning progress display section 64 of FIG. 7B, in addition to the ship mark 64a and track 64b, a circular route 64c is displayed as a broken line. In a range of the turning progress display section 64 where the ship mark 64a moves corresponding to the circular movement, the circular route 64c is displayed in a part where the track 64b is not displayed. Thus, the operator can instinctively grasp that the ship is in the circular movement.

By the above configuration, the progress of the turn (circular movement) can be displayed by using the track 64b and the like. Therefore, the autopilot device 20 can exert similar effects to the cases of FIG. 2A to 4B and FIGS. 5A to 6B.

Although the preferred embodiment of this disclosure is described above, the above configurations may be modified as follows.

As the azimuth information, any information may be used as long as it is either one of information indicating the orientation of the ship, information indicating the traveling direction of the ship, and information that changes cooperating with the change of the orientation of the ship.

The progress of the turn may be displayed on other than the display unit 25 provided to the autopilot device 20. For example, it may be displayed on a display unit of a plotter apparatus or a general-purpose display to which a plurality of instruments are connected. In this case, the autopilot device 20, the display unit and the like correspond to a turning progress display apparatus as a whole.

The course of the ship may be controlled through a control of a power unit, such as thrusters, instead of the steering of the rudder 31.

The components of this disclosure are not required to be accommodated in a single housing, and they may be a combination of separate devices.

In this embodiment, the ship is given as an example of the movable body; however, this disclosure can be applied to other movable bodies, such as aircrafts and ground vehicles (utility ground vehicles). With an aircraft, since it generally includes an azimuth sensor similarly to a ship, this disclosure can be achieved by having a similar configuration to this embodiment. Moreover, with a ground vehicle, this disclosure can be achieved by using an azimuth sensor similarly to this embodiment or using a sensor that detects an angle of a steering wheel and/or angles of drive wheels. Also in the case where this disclosure is applied to either one of the aircraft and the ground vehicle, similar effects to the case of the ship can be obtained.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A turning progress display apparatus, comprising:
    a controller configured to acquire azimuth information from a heading sensor that is at least one of information of an orientation of a movable body, information of a traveling direction of the movable body, and information that changes cooperating with a change of the orientation of the movable body;
    wherein the controller is configured to execute a progress calculating module configured to calculate a progress of the turn based on the azimuth information acquired by the controller and at least one of a target value of the azimuth information for before the turn and a target value of the azimuth information for the turn; and
    a display unit configured to display the turning progress calculated by the progress calculating module;
    wherein the display unit displays the azimuth information acquired by the controller and the target value of the azimuth information for the turn, as the turning progress; and
    wherein the display unit displays a scale part in either one of a circular shape and an annular shape; and
    wherein in the scale part, a portion corresponding to a range between the value of the azimuth information acquired by the controller and the target value of the azimuth information for the turn, is displayed in a different mode from other portion.

2. The turning progress display apparatus of claim 1, wherein the movable body is a ship.

3. The turning progress display apparatus of claim 1, wherein the display unit also displays the target value of the azimuth information for before the turn, as the turning progress.

4. The turning progress display apparatus of claim 1, wherein the progress calculating module calculates the turning progress based on information indicating either one of a start and a completion of the turn, and the azimuth information acquired by the controller.

5. The turning progress display apparatus of claim 1, wherein the movable body is a ship,
    wherein the information indicating the orientation of the movable body is a heading acquired by the heading sensor, and
    wherein the progress calculating module calculates the turning progress based on the heading acquired by the heading sensor and at least one of the target value of the azimuth information for before the turn and the target value of the azimuth information for the turn.

6. The turning progress display apparatus of claim 5, wherein the display unit displays a mark of the ship that rotates corresponding to the turn.

7. The turning progress display apparatus of claim 1, wherein the information that changes cooperating with the change of the orientation of the ship is a wind direction relative to the movable body.

8. An autopilot device, comprising:
    a controller configured to acquire azimuth information from a heading sensor that is at least one of information of an orientation of a movable body, information of a traveling direction of the movable body, and information that changes cooperating with a change of the orientation of the movable body;
    wherein the controller is configured to execute:
        a progress calculating module configured to calculate a progress of the turn based on the azimuth information acquired by the controller and a target value of the azimuth information; and
        an autopilot module configured to generate a control signal to perform a turning operation by autopilot; and
    a display unit configured to display the turning progress calculated by the progress calculating module;
    wherein the display unit displays the azimuth information acquired by the controller and the target value of the azimuth information for the turn, as the turning progress; and
    wherein the display unit displays a scale part in either one of a circular shape and an annular shape; and wherein in the scale part, a portion corresponding to a range between the value of the azimuth information acquired by the controller and the target value of the azimuth information for the turn, is displayed in a different mode from other portion.

9. A method of displaying a progress of a turn, comprising:

acquiring azimuth information that is either one of information of an orientation of a movable body, information of a traveling direction of the movable body, and information that changes cooperating with a change of the orientation of the movable body;

calculating the progress of the turn based on the acquired azimuth information and a target value of the acquired azimuth information; and displaying the calculated turning progress;

wherein the azimuth information and the target value of the acquired azimuth information for the turn are displayed as the turning progress; and wherein a scale part is displayed in either one of a circular shape and an annular shape; and wherein in the scale part, a portion corresponding to a range between the value of the azimuth information and the target value of the azimuth information for the turn, is displayed in a different mode from other portion.

* * * * *